(12) United States Patent
Matsumoto et al.

(10) Patent No.: US 7,353,616 B2
(45) Date of Patent: Apr. 8, 2008

(54) SHAPE MEASURING INSTRUMENT

(75) Inventors: Takashi Matsumoto, Kariya (JP);
Yasuo Niino, Hoi-gun (JP); Toshiyuki Okita, Nishio (JP); Yoshiji Yamamoto, Toyohashi (JP)

(73) Assignee: JTEKT Corporation, Osaka-shi (JP)

( * ) Notice: Subject to any disclaimer, the term of this patent is extended or adjusted under 35 U.S.C. 154(b) by 127 days.

(21) Appl. No.: 11/440,049

(22) Filed: May 25, 2006

(65) Prior Publication Data
US 2006/0271333 A1 Nov. 30, 2006

(30) Foreign Application Priority Data
May 26, 2005 (JP) .............................. 2005-153284

(51) Int. Cl.
*G01B 13/16* (2006.01)
*G01B 5/20* (2006.01)
*G01B 7/28* (2006.01)

(52) U.S. Cl. .......................................... 33/554; 33/551
(58) Field of Classification Search ................. 33/554, 33/551, 549, 553, 555, 556, 558, 559, 561
See application file for complete search history.

(56) References Cited

U.S. PATENT DOCUMENTS

| 3,785,056 | A | * | 1/1974 | Schiler | 33/559 |
| 4,137,641 | A | * | 2/1979 | Lauri | 33/551 |
| 4,389,786 | A | * | 6/1983 | Sakata et al. | 33/561 |
| 4,669,300 | A | * | 6/1987 | Hall et al. | 33/551 |
| 5,174,039 | A | * | 12/1992 | Murai | 33/556 |
| 5,473,822 | A | * | 12/1995 | Struble | 33/559 |
| 6,209,217 | B1 | * | 4/2001 | Tsuruta et al. | 33/554 |
| 6,295,866 | B1 | * | 10/2001 | Yamamoto et al. | 33/551 |
| 6,758,085 | B2 | * | 7/2004 | Nagaike et al. | 33/556 |
| 6,804,896 | B2 | * | 10/2004 | Gass et al. | 33/558 |
| 7,076,883 | B2 | * | 7/2006 | Yamamoto et al. | 33/556 |

FOREIGN PATENT DOCUMENTS

| JP | 7-260471 | 10/1995 |
| JP | 2004-301669 | 10/2004 |
| WO | WO 03/023369 A2 | 3/2003 |

* cited by examiner

*Primary Examiner*—Christopher W Fulton
(74) *Attorney, Agent, or Firm*—Oblon, Spivak, McClelland, Maier & Neustadt, P.C.

(57) ABSTRACT

A shape measuring instrument is provided as being capable of measuring a surface shape of a target with a small contact force while changing the contact force. A measuring probe 32 is supported while a tilt θ is provided. A retracting force of the measuring force 32 is produced by the tilt θ, and thus, is obtained as mgsig θ which is much small as compared with a self weight "m". On the other hand, biasing is provided with an extruding force Fc by means of an air cylinder 40. Thus, a contact force of the measuring probe 32 relevant to a work piece W is obtained as a difference between a measuring probe self weight tilt component mgsigθ and the extruding force Fc of the air cylinder 40 (F=Fc−mgsigθ), thus making it possible to reduce a contact force to be very small.

7 Claims, 7 Drawing Sheets

SHAPE MEASURING INSTRUMENT

CROSS-REFERENCE TO RELATED APPLICATION

The present application claims priority under 35 U.S.C. §119 to Japanese Patent Application No. JP2005-153284. The content of the application is incorporated herein by reference.

BACKGROUND OF THE INVENTION

1. Field of the Invention

The present invention relates to a shape measuring instrument having a contact type measuring probe, more preferably, to a machine-mount type shape measuring instrument mounted on a processing machine.

2. Description of the Related Art

Japanese Laid-Open Patent Publication No. 7-260471 (hereinafter referred to as Related Art 1) and Japanese Laid-Open Patent Publication No. 2005-502876 (hereinafter referred to as Related Art 2) are incorporated herein by reference.

Conventionally, a shape measuring instrument for measuring a surface shape of an optical lens or the like has reduced a contact pressure to its required minimum so as not to damage a target. Such shape measuring instruments having reduced contact pressure is disclosed in Related Art 1 and Related Art 2 or the like, for example.

The shape measuring instrument of Related Art 1 will be described with reference to FIG. 6.

In Related Art 1, a contact pressure is adjusted while a measuring probe is maintained in a gravity direction, and gravity is balanced with a spring or the like. That is, the shape measuring instrument comprises, a measuring probe 32 which comes into contact with a target 180 vertically from above, a spring 152 for adjusting a gravity component of the measuring probe 32; and a position detector 154 for detecting a position of the measuring probe.

In addition, in Related Art 2, as shown in FIG. 7, a measuring probe 32 is inclined and maintained by supporting means 134, thereby reducing a contact pressure to the target 180. Adjustment of the contact pressure is made by using tilt adjusting means 136. In other words, this adjustment is accomplished by adjusting a tilt angle of the measuring probe 32.

However, the shape measuring instrument of Related Art 1 is of type of applying a measuring probe 32 to the target 180 from above, thus, making it difficult to mount a horizontal type ultra-precision processing machine which facilitates ejection of chips. In addition, it is difficult to control a measurement pressure due to spring nonlinearity. Therefore, there is a problem that the measurement pressure is changed due to a stroke position of the measuring probe.

On the other hand, in a shape measuring instrument of Related Art 2, a measurement pressure has not been easily changed successfully because the pressure has been adjusted by changing a tilt angle of a measuring probe 32. For example, at the time of measuring a target of a shape shown in FIG. 5, when a tilt face indicated by P2 is measured with respect to a case of measuring a planer position indicated by P1 (perpendicular face relevant to the measuring probe 32), a couple is applied to the measuring probe 32 resulting in some deflection, and a measurement error occurs. Thus, it is desirable to reduce a measurement pressure. However, it has been difficult to reduce the measurement pressure during measurement in Related Art 2. In addition, if the tilt angle of the measuring probe 32 is changed by tilt adjusting means 136, thereby adjusting the measurement pressure, a site at which the measuring probe 132 abuts against the target 180 is changed, and an error occurs.

SUMMERY OF THE INVENTION

It is an object of the present invention to provide a shape measuring instrument capable of measuring a surface shape of a target.

In order to achieve the above and other objects, a shape measuring instrument 30, comprises:

a measuring probe 32 which comes into contact with a surface of a target;

support member 42 which is configured to support the measuring probe 32 so that an axial direction of the measuring probe 32 is tilted with respect to a horizontal direction and the measuring probe is retracted by a self weight;

biasing member 40 which is configured to protrude the measuring probe to the side of the target against the self weight; and a position detector 44 which is configured to measure an axial position of the measuring probe 32.

According to a first aspect of the present invention, a shape measuring instrument 30 supports a measuring probe 32 by supporting means 42 while providing a tilt θ so that the probe is retracted by a self weight. On the other hand, the measuring probe 32 is biased by biasing means 40 so as to be protruded to a target W side. Thus, a contact force of the measuring probe 32 relevant to the target W is obtained as a difference between a retracting force caused by the self weight of the measuring probe 32 supported to provide a tilt by the supporting means 42 and a biasing force of the biasing means 42, thus making it possible to adjust the contact force so as to be very small. In addition, the contact force can be continuously changed by changing the biasing force of the biasing means 42.

According to a second aspect of the present invention, biasing means is made of an air cylinder 40 for biasing means to bias the measuring probe 32 with an air pressure, thus making it possible to easily adjust a biasing force applied to the measuring probe 32.

According to a third aspect of the present invention, in a shape measuring instrument 30, a position detector is made of a linear scale 44, thus making it possible to precisely measure a position of the measuring probe 32.

According to a fourth aspect of the present invention, in a shape measuring instrument, a measuring probe 32 is supported by an air bearing 42 while a tilt θ is provided so as to be retracted by the self weights of a driven shaft 36 and a drive shaft 34 comprising the measuring probe 32. On the other hand, the measuring probe 32 is biased so as to be protruded to a target W side by means of an air cylinder 40. Thus, the contact force of the measuring probe 32 relevant to the target W is obtained as a difference between a retracting force caused by the self weight of the driven shaft 36 and the drive shaft 34 supported to provide a tilt θ by the air bearing 42 and a biasing force (air pressure) of the air cylinder 40, thus making it possible to adjust the contact force so as to be very small. In addition, the contact force can be continuously changed by changing the biasing force of the biasing means 42.

DESCRIPTION OF THE PREFERRED EMBODIMENTS

Hereinafter, preferred embodiments of the present invention will be described with reference to the accompanying drawings.

Figure 1:
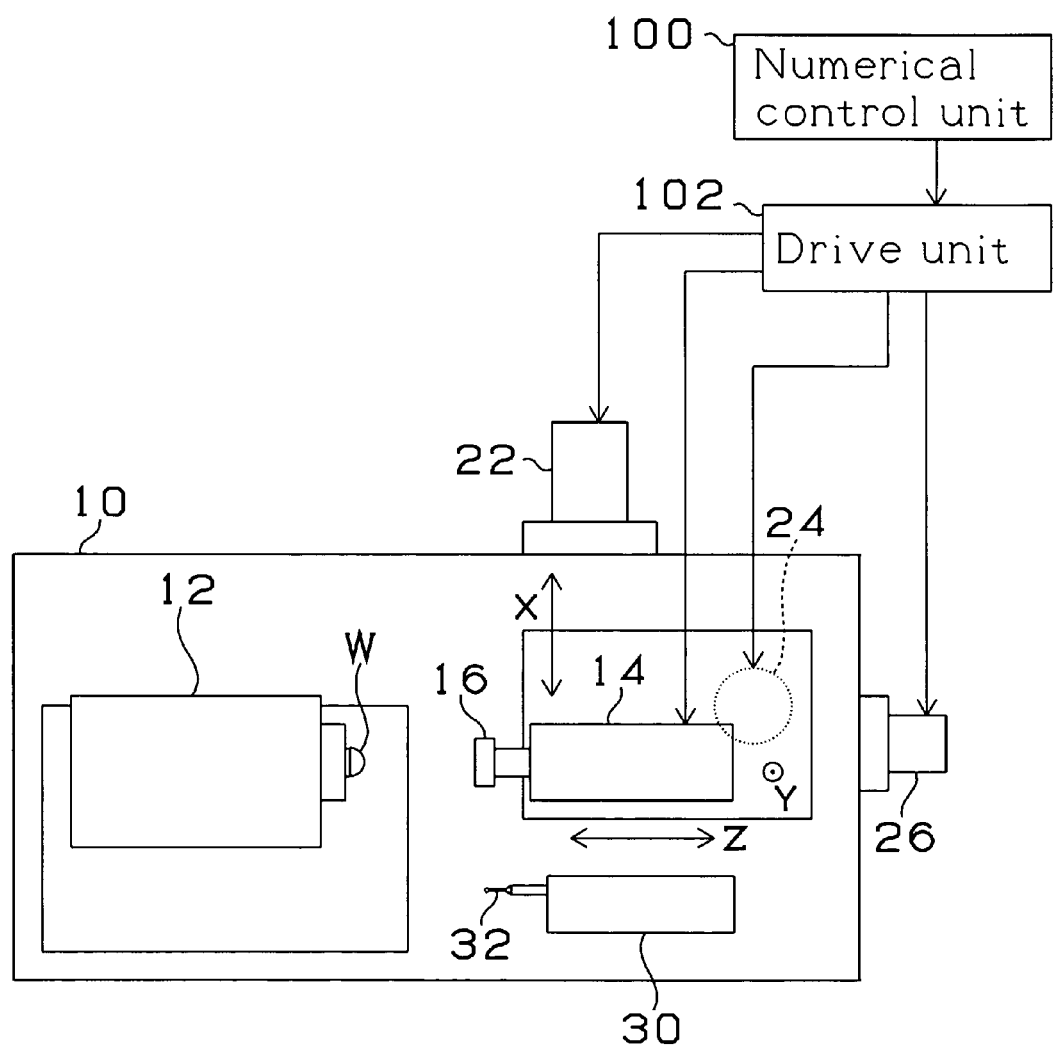
FIG. 1 is a schematic block diagram depicting an arrangement of an ultra-precision processing machine which mounts a shape measuring instrument according to an embodiment of the present invention.

FIG. 1 depicts an arrangement of an ultra-precision processing machine which mounts a shape measuring instrument according to an embodiment of the present invention.

An ultra-precision processing machine 10 comprises a work fixing base 12 for fixing a workpiece W, a grinding spindle 14 for holding a tool 16, a servo motor 22 for feeding the grinding spindle 14 in an X axis direction, a servo motor 24 for feeding the grinding spindle 14 in a Y axis direction; and a servo motor 26 for feeding the grinding spindle 14 in a Z axis direction. A shape measuring instrument 30 for measuring a shape of a workpiece W by means of a measuring probe 32 is provided together with the grinding spindle 14.

Figure 2:
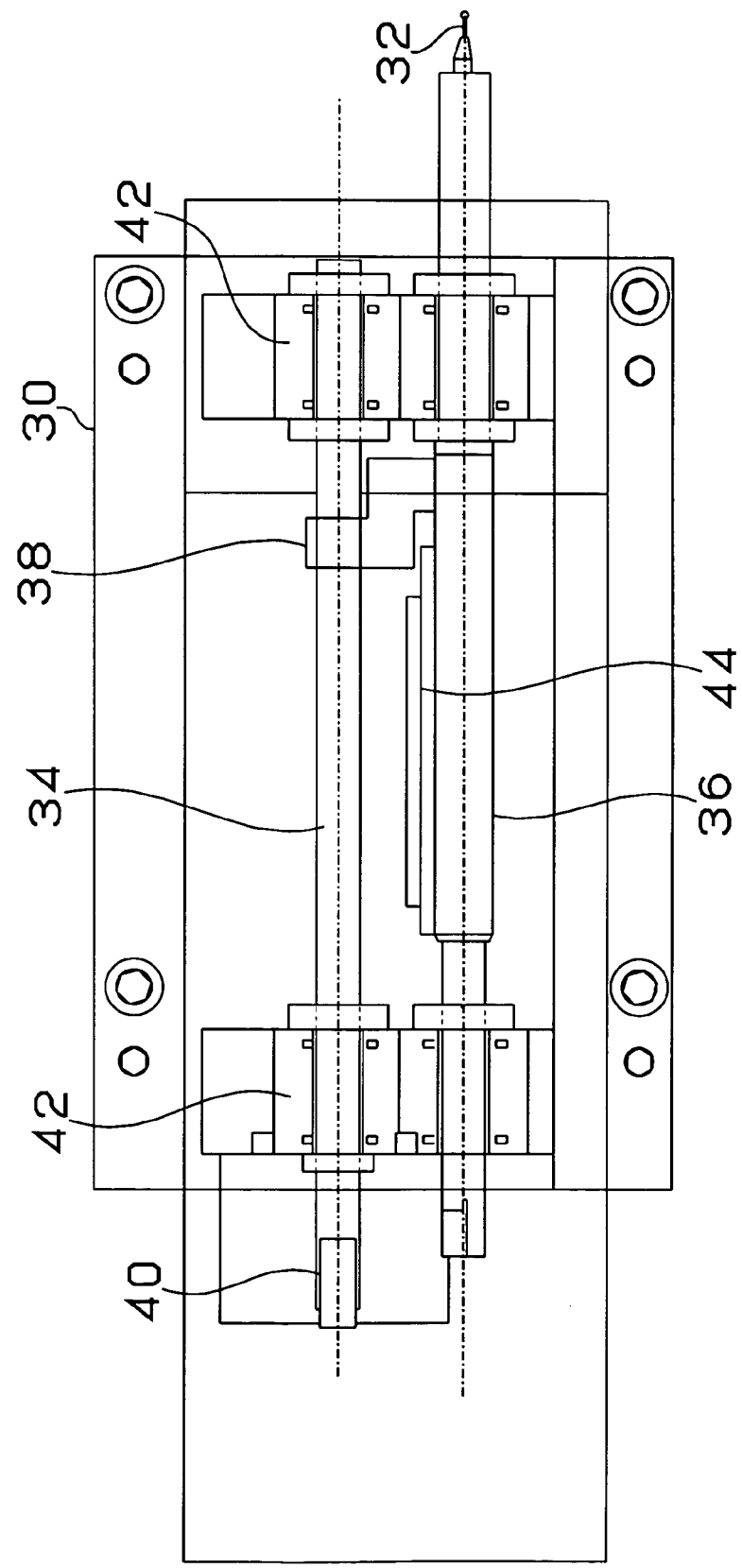
FIG. 2 is a plan view showing the shape measuring instrument.

An arrangement of a shape measuring instrument 30 will be described with reference to a plan view of FIG. 2.

The shape measuring instrument 30 comprises: a drive cylinder 34 biased by means of an air cylinder 40; and a driven cylinder 36 coupled with the drive cylinder 34 by means of a bracket 38. A measuring probe 32 is mounted on the driven cylinder 36. The drive cylinder 34 and the driven cylinder 36 are supported in a tilted state by means of an air bearing 42. That is, the drive cylinder 34 and the driven cylinder 36 are supported while a slight tilt is provided so as to be retracted by their self weights by means of the air bearing 42 (to the left direction shown in the figure). At the driven cylinder 36, a linear scale 44 is provided as a position detector. In the shape measuring instrument 30, strokes of the driven cylinder 36 are set to 10 mm. As described later, this measuring instrument is configured so that a measurement pressure can be structurally adjusted within the range of several tens of mgf (milligram force) to several hundreds of mgf. In the present embodiment, circumferential stop of a cylindrical shape cylinder is achieved by providing the bracket 38 that couples the drive cylinder 34 and the driven cylinder 36.

Figure 3:
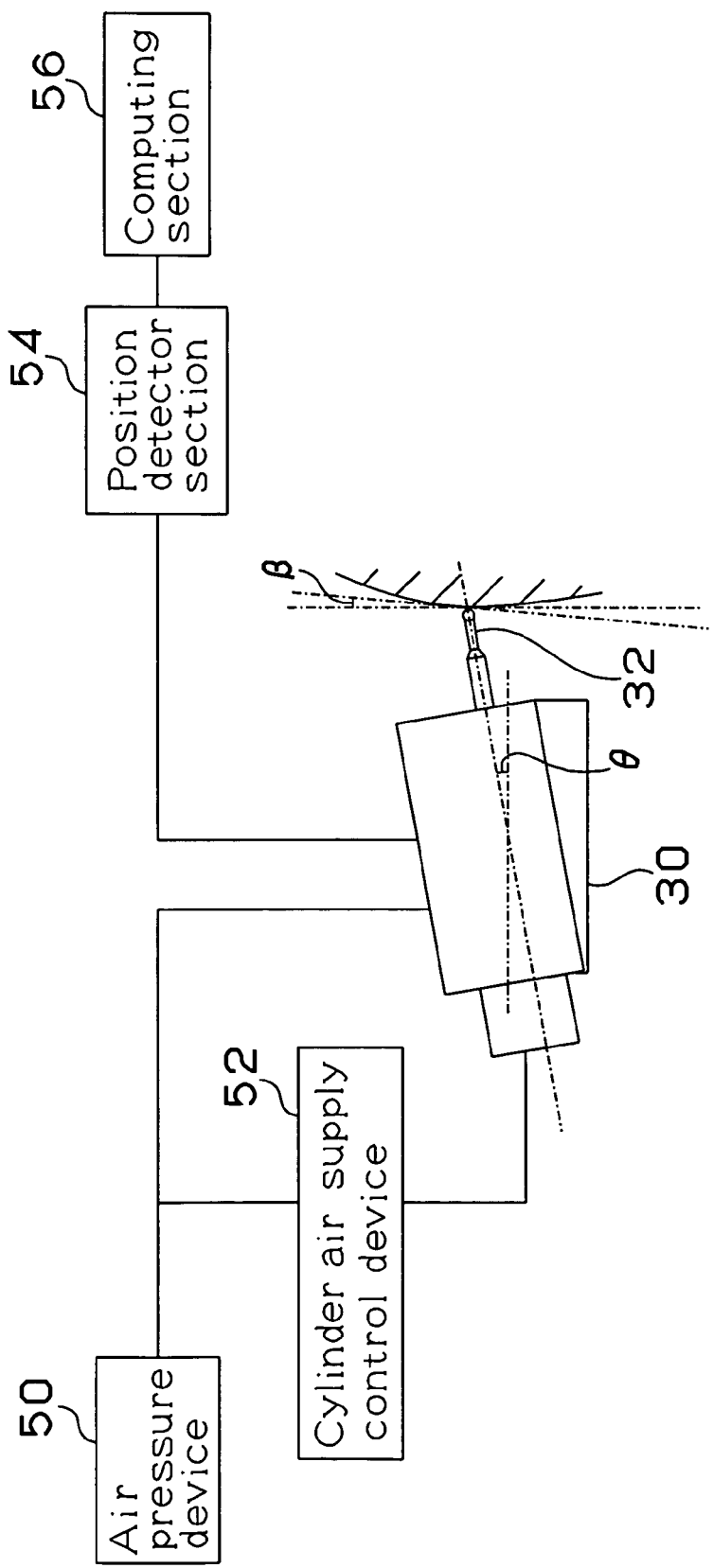
FIG. 3 is a block diagram depicting a control arrangement of the shape measuring instrument.

A control arrangement of a shape measuring instrument 30 will be described with reference to FIG. 3.

An air pressure device 50 for generating an air pressure and a cylinder air pressure supply control device 52 for adjusting an air pressure to an air cylinder 40 of the shape measuring instrument 30 are connected to the shape measuring instrument 30. The air pressure from the air pressure device 50 is designed so as to be directly supplied to an air bearing 42. An output from a linear scale 44 is inputted to a position detector section 54, and the detected position is outputted to a computing section 56.

Figure 4:
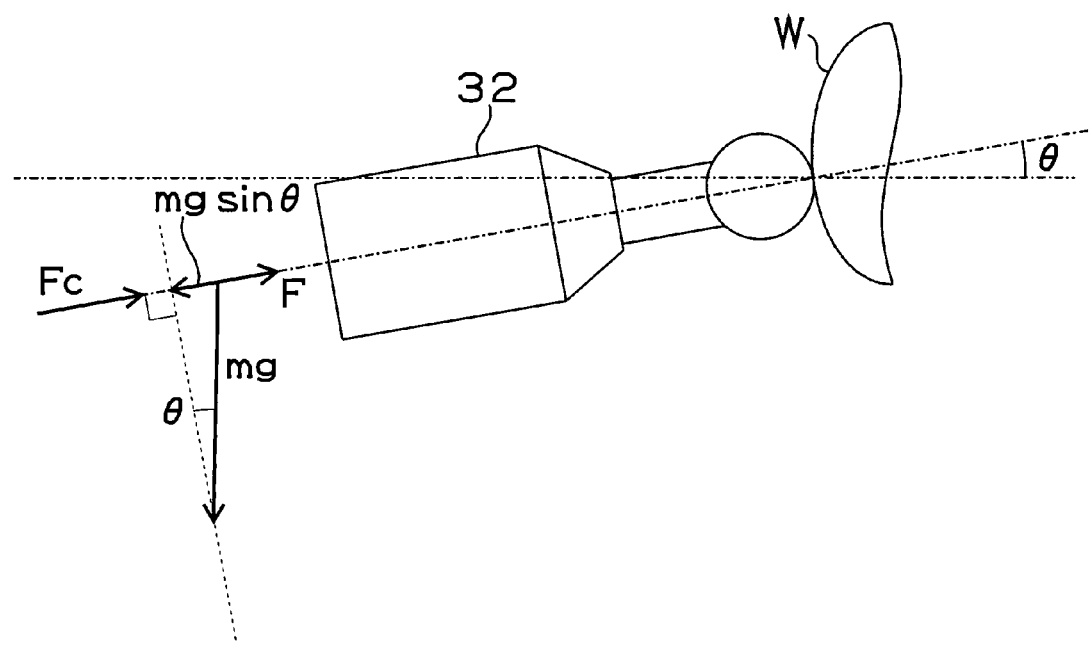
FIG. 4 is an illustrative view illustrating a contact pressure at the shape measuring instrument.

Referring to FIG. 4, a description will be given with respect to a contact force (measurement pressure) of a measuring probe 32 at a shape measuring instrument 30 according to the embodiment.

In the shape measuring instrument 30 according to the present embodiment, a measuring probe 32 is supported by means of an air bearing 42 while a tilt θ is provided so as to be retracted by a self weight "m" of a driven cylinder 36 and a drive cylinder 34 which comprise the measuring probe 32. A frictional force of the air cylinder 40 is very low. Here, a retracting force of the driven cylinder 36 and the drive cylinder 34 is produced with a tilt θ at an air bearing, and is obtained as mgsigθ which is much smaller as compared with a self weight m. On the other hand, by means of the air cylinder 40, the measuring probe 32 is biased with an extruding force Fc so as to be protruded to a work piece W side. Thus, a contact force F of the measuring probe 32 relevant to the work piece W is obtained as a difference between a retracting force (measuring probe self weight tilt component) mgsigo caused by self weights "m" of the driven cylinder 36 and the drive cylinder 34 supported while a tilt is provided by means of the air bearing 42 and an extruding force Fc of the air cylinder 40 (F=Fc−mgsigθ), thus making it possible to adjust a contact force F to be very small. Therefore, a surface of a target which is easily plastically deformed, such as an aluminum product or a resin product, can be measured without being deformed. While the tilt θ is provided to be large for the purpose of clear understanding in FIG. 4, this tilt is provided as a very small angle undistinguishable from a horizontal surface in actuality.

The shape measuring instrument 30 according to the present embodiment uses an air cylinder 40 for biasing a measuring probe 32 with an air pressure, thus making it possible to easily adjust a biasing force applied to the measuring probe 32 by the cylinder air supply control device 52. In addition, an air bearing 42 can be operated by means of an air pressure device 50 for generating an air pressure to be supplied to the air cylinder 40, and a drive source can be shared. Further, in the shape measuring instrument according to the present embodiment, a position detector is made of a linear scale 44, thus making it possible to precisely measure a position of the measuring probe 32.

Figure 5:
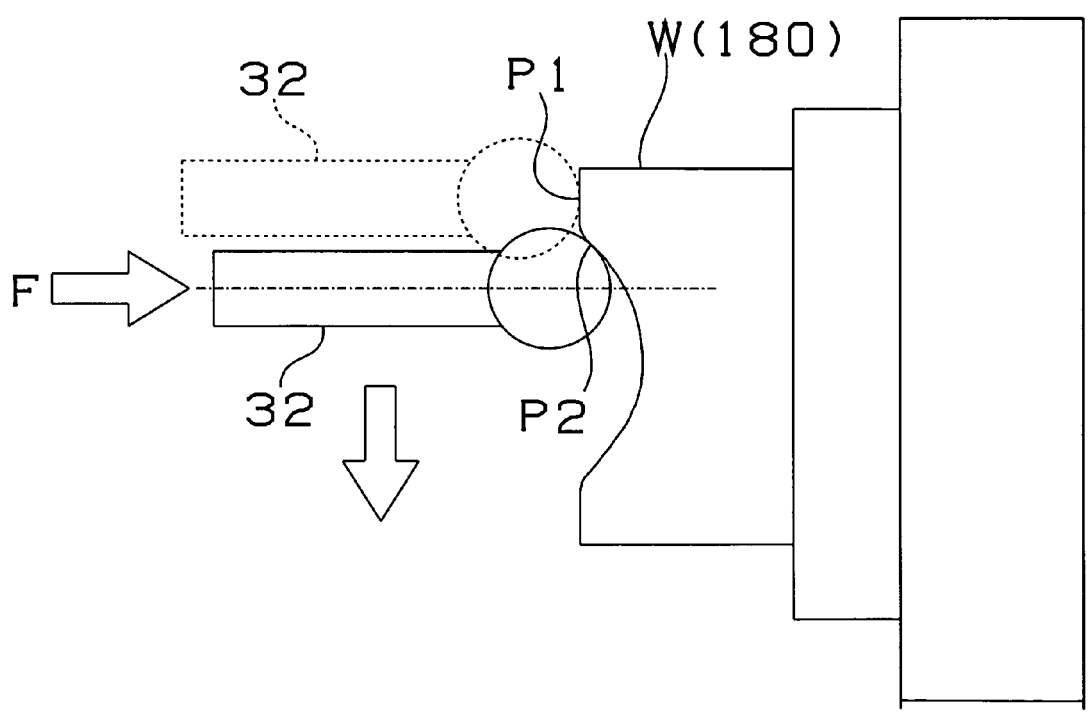
FIG. 5 is an illustrative view illustrating work piece measurement at the shape measuring instrument.
Figure 6:
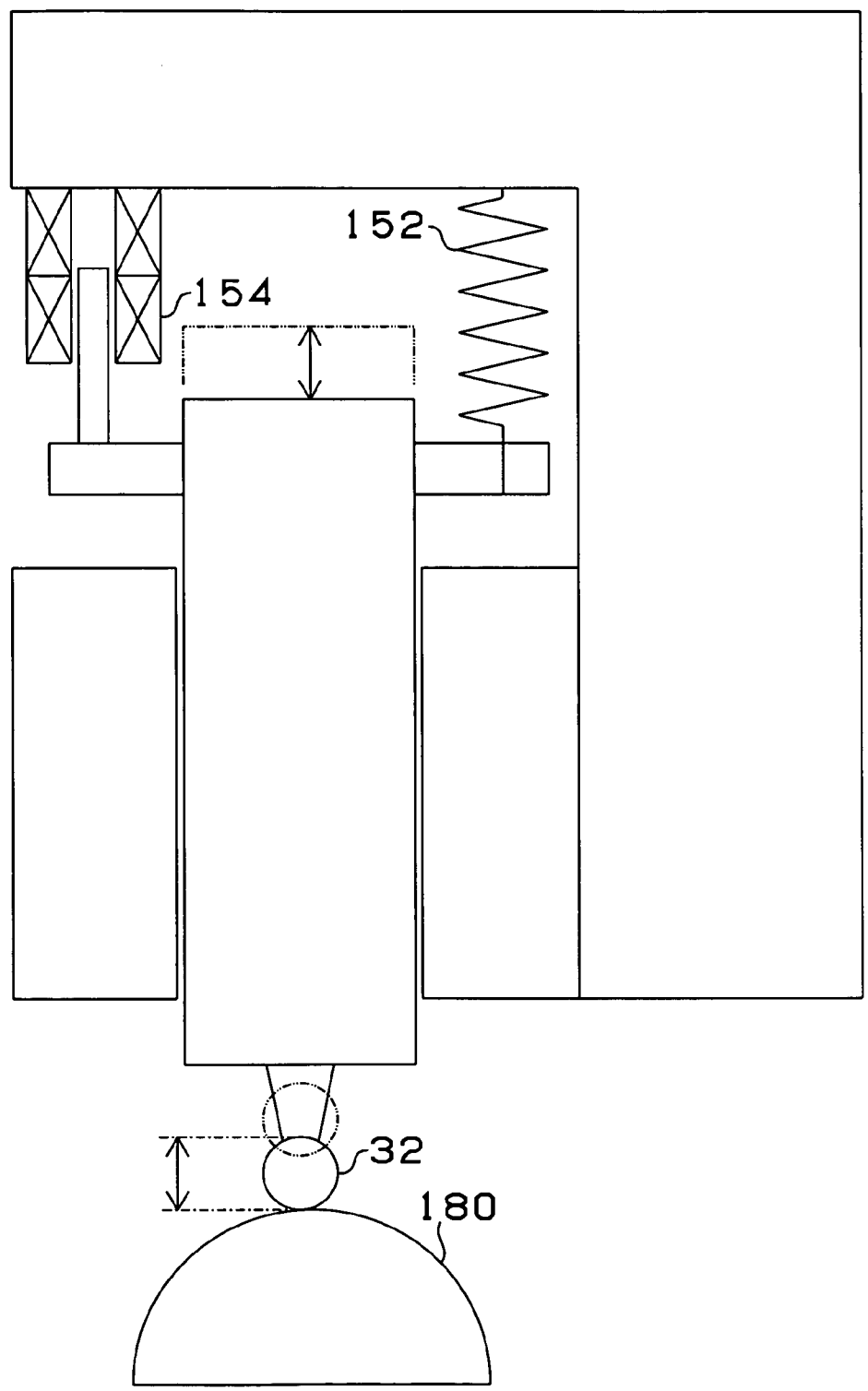
FIG. 6 is an illustrative view showing a shape measuring instrument according to a related art.

In the shape measuring instrument 30 according to the present embodiment, the measurement pressure of the measuring probe 32 can be continuously changed by changing the biasing force (extruding force Fc) of the air cylinder 40, whereby a complicated surface shape of a workpiece can be precisely measured. FIG. 5 is an illustrative view illustrating a shape of a work piece. At the time of measuring a workpiece W formed in the shape shown in FIG. 5, in the case of measuring a planar position indicated by P1 (perpendicular face relevant to the measuring probe 32), the biasing force (extruding force Fc) of the air cylinder 40 is increased. For example, by using a measurement pressure of 100 mgf, noise caused by mechanical vibration prone to occur at a low measurement pressure can be prevented from overlapped to the detected position.

Figure 7:
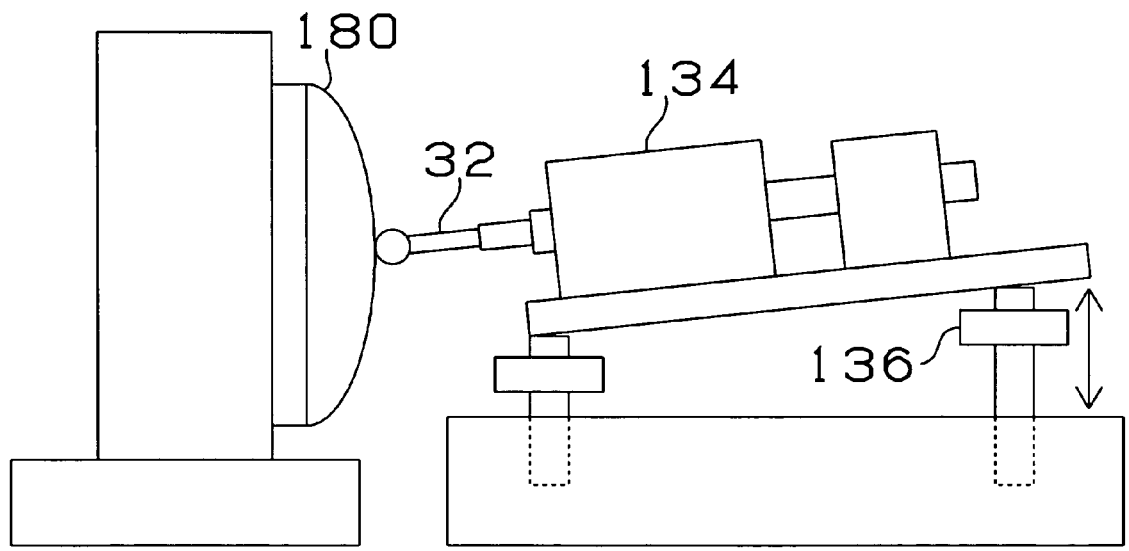
FIG. 7 is an illustrative view showing a shape measuring instrument according to a related art.

On the other hand, at the time of measuring a tilt face indicated by P2, the biasing force (extruding force Fc) of the air cylinder 40 is reduced. For example, the use of a measurement pressure of 50 mgf which is as half as usual, prevents applying of a couple from being applied to a tilt face, an occurrence of deflection with the measuring probe 32, and an occurrence of a measurement error. At this time, while the noise caused by mechanical vibration produced at a low measurement pressure is prone to be overlapped to the detected position, this error is much smaller than an error difference caused by the deflection of the measuring probe 32. In addition, in the shape measuring instrument according to the present embodiment, unlike the shape measuring instrument of Related Art 2 described above with reference to FIG. 7, even if a measurement pressure is changed during measurement, a position at which the measuring probe 32 abuts against a target 180 does not change.

In the shape measuring instrument according to the present embodiment, in a state in which the measuring probe 32 is pressed against the workpiece W, a scanning movement stage (processing machine control axes) is driven, and a measurement face of the target 180 is scanned. The measuring probe 32 moves along the shape of the work piece W. Thus, the trajectory of the measuring probe 32 at the time of such movement is obtained as a shape of the workpiece W.

In the case where shape measurement with high precision is required, there is a need for an always constant measurement pressure. The shape measuring instrument according to the present embodiment does not include a nonlinear element, unlike that of Related Art 1, and thus, the measurement pressure does not change depending on a stroke position of the measuring probe.

The driven cylinder 36 and drive cylinder 34 for supporting the measuring probe are supported by means of the air bearing 42 whose frictional force is very small. In addition, the measurement pressure is obtained as a difference between the measuring probe self weight tilt component (mgsigθ) and the extruding force Fc of the air cylinder 40 (F=Fc−mgsigθ). Therefore, in the shape measuring instrument according to the present embodiment, it is possible to reduce a contact force to be very small.

While, in the above described embodiment, a measuring probe has been moved so as to follow the shape of a fixed workpiece W, the workpiece W can be moved along the machine control axes in accordance with a processing program while the measuring probe is fixed. At this time, a fluctuation of the measuring probe position corresponds to a processing error.

While, in the above described embodiment, a linear scale has been used as a position detector, a variety of detectors such as a laser interferometer, an eddy current type detector, and an electrostatic capacity type detector are available for use as the position detector. Further, while in the above embodiment, a shape measuring instrument has been composed of two cylinders, a drive cylinder and a driven cylinder, the shape measuring instrument can also be composed of one cylinder.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A shape measuring instrument, comprising:
    a measuring probe which comes into contact with a surface of a target;
    support member configured to support the measuring probe so that an axial direction of the measuring probe is tilted with respect to a horizontal direction and the measuring probe is retracted by a self weight;
    biasing member configured to protrude the measuring probe to the side of the target against the self weight; and
    a position detector configured to measure an axial position of the measuring probe.

2. A shape measuring instrument as claimed in claim 1, wherein the biasing member is an air cylinder to protrude the measuring probe by an air pressure.

3. A shape measuring instrument as claimed in claim 2, further comprising:
    a drive shaft biased by the air cylinder; and
    a driven shaft having the measuring probe and interlocked with the drive shaft.

4. A shape measuring instrument as claimed in claim 3, wherein the support member comprises an air bearing for supporting the drive shaft and the driven shaft.

5. A shape measuring instrument as claimed in claim 4, further comprises a common air pressure device supplying air pressure to the air cylinder and the air bearing.

6. A shape measuring instrument as claimed in claim 1, wherein the position detector is a linear scale.

7. A shape measuring instrument, comprising;
    contact means for contacting with a surface of a target;
    support means for supporting the contact means so that an axial direction of the contact means is tilted with respect to a horizontal direction and the contact means is retracted by a self weight;
    biasing means for protruding the contact means to the side of the target against the self weight; and
    position detecting means for measuring an axial position of the contact means.

* * * * *